(12) United States Patent
Hsu

(10) Patent No.: US 8,047,731 B2
(45) Date of Patent: Nov. 1, 2011

(54) ELECTRONIC DEVICE

(75) Inventor: Hsueh-Feng Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/787,714

(22) Filed: May 26, 2010

(65) Prior Publication Data

US 2011/0150456 A1   Jun. 23, 2011

(30) Foreign Application Priority Data

Dec. 23, 2009   (TW) .............................. 98144351 A

(51) Int. Cl.
  *G03B 17/00*   (2006.01)
  *G03B 11/04*   (2006.01)
  *G02B 23/16*   (2006.01)

(52) U.S. Cl. .......... 396/448; 348/375; 359/511

(58) Field of Classification Search .......... 396/448; 348/373, 375, 376; 359/511
See application file for complete search history.

(56) References Cited

U.S. PATENT DOCUMENTS

2007/0274029 A1 * 11/2007 Lee et al. .............. 361/679

* cited by examiner

*Primary Examiner* — Rochelle-Ann J Blackman
(74) *Attorney, Agent, or Firm* — Altis Law Group, Inc.

(57) ABSTRACT

An electronic device includes a main body, a lens received in the main body, and a collapsible lens cover with one end fixed on the main body and the other end capable of resisting or detaching from the main body such that the lens is covered or uncovered.

20 Claims, 4 Drawing Sheets

ELECTRONIC DEVICE

BACKGROUND

1. Technical Field

The present disclosure generally relates to electronic devices, and more particularly to an electronic device with a lens cover.

2. Description of Related Art

Many electronic devices, not only cameras and video cameras, but also mobile phones, personal digital assistants (PDAs), and other electronic devices utilize a lens to capture image or video data. Exposure of the lenses to the environment, however may incur damage, and the lenses are vulnerable to physical impact.

Such devices, accordingly, often include a lens cover slidably covering the lens, thereby providing protection thereto. However, the lens cover requires a relatively large space to slide. As a result, the volume of the electronic device is increased.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
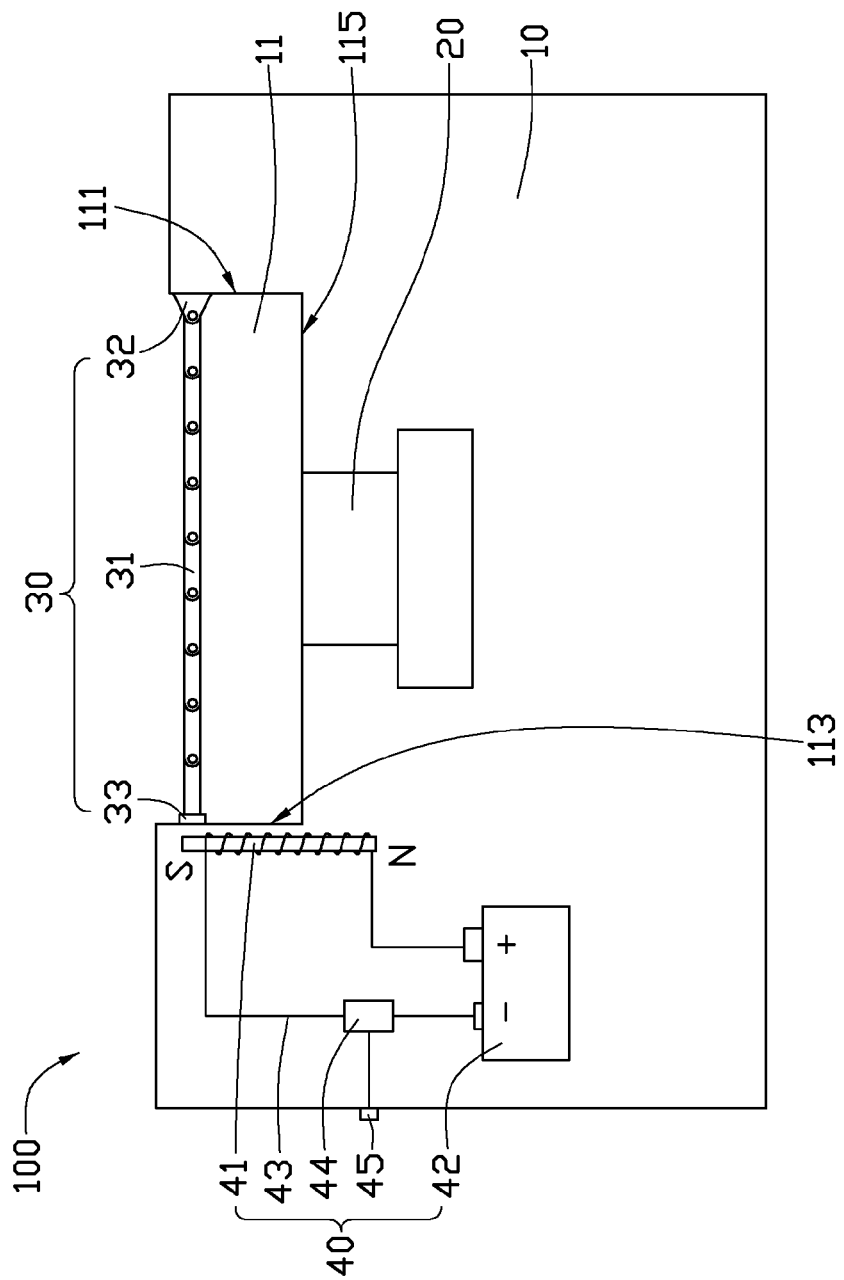
FIG. 1 is an assembled view of a first embodiment of an electronic device including a lens and a lens cover, showing the lens cover covering the lens.

Referring to FIG. 1, a first embodiment of an electronic device 100 includes a main body 10, a lens 20 received in the main body 10, a lens cover 30 capable of covering the lens 20, and a magnetic control assembly 40.

The main body 10 defines a recess 11, wherein the lens 20 is received in the main body 10 and exposed in the recess 11. The recess 11 is defined by a first inner sidewall 111, a second inner sidewall 113 opposite to the first inner sidewall 111, and an inner bottom surface 115 connecting the first and second inner sidewalls 111, 113. The lens 20 is exposed in the recess 11 from the inner bottom surface 115.

The lens cover 30 includes a collapsible portion 31, a fixing seat 32 and a magnetic body 33. The collapsible portion 31 includes a plurality of plates individually hinged to each other. The fixing seat 32 is fixed on the main body 10 and hinged to one end of the collapsible portion 31. The magnetic body 33 is hinged to the other end of the collapsible portion 31 and resists or separates from the main body 10.

The magnetic control assembly 40 includes an iron core 41, a power supply 42, a lead wire 43, an electromagnetic valve 44, and a control button 45. Two ends of the lead wire 43 are electrically connected to two electrodes of the power supply 42, respectively, and the lead wire 43 partially encircles the iron core 41 to form an electromagnet. Two ends of the electromagnetic valve 44 are electrically connected to the lead wire 43, respectively, such that the circuit can be turned on and off. The control button 45 is connected to the electromagnetic valve 44.

In this electronic device 100, the fixing seat 32 of the lens cover 30 is fixed on the first inner sidewall 111 of the recess 11. All of the components of the magnetic control assembly 40 other than the control button 45 are received in the main body 10 and adjacent to the second inner sidewall 113 of the recess 11. The control button 45 of the magnetic control assembly 40 extends out of the main body 10 and is connected to the electromagnetic valve 44 by the lead wire 43.

In the illustrated embodiment, the iron core 41 and the lead wire 43 cooperatively form the electromagnet with a magnetic pole S adjacent to a portion of the second inner sidewall 113 for the magnetic body 33 of the lens cover 30 to resist. An end of the magnetic body 33 away from the collapsible portion 31 has a magnetic pole N correspondingly. Alternatively, the electromagnet may have a magnetic pole N adjacent to the portion of the second inner sidewall 113 for the magnetic body 33 of the lens cover 30 to resist, and the magnetic body 33 away from the collapsible portion 31 has a magnetic pole S correspondingly. Accordingly, opposite magnetic poles of the electromagnet formed by the iron core 41 and the lead wire 43 and the magnetic body 33 of the lens cover 30 face each other.

In use, the lens 20 is exposed and uncovered. If the lens 20 is to be covered, the control button 45 of the magnetic control assembly 40 activates the electromagnetic valve 44, the circuit is turned on and the electromagnet generates a magnetic field. When the magnetic body 33 is attracted to be adjacent to the second inner sidewall 113 due to the magnetic force, the magnetism between the iron core 41 and the magnetic body 33 may impel the collapsible portion 31 to extend until the magnetic body 33 resists the second inner sidewall 113 of the recess 11. Therefore, the magnetic body 33 of the lens cover 30 is attracted to be in contact with the second inner sidewall 113 of the recess 11 due to the magnetic force, and the lens cover 30 finally extends and covers the lens 20 completely. In other words, the lens cover 30 is deformed in an extended state.

Figure 2:
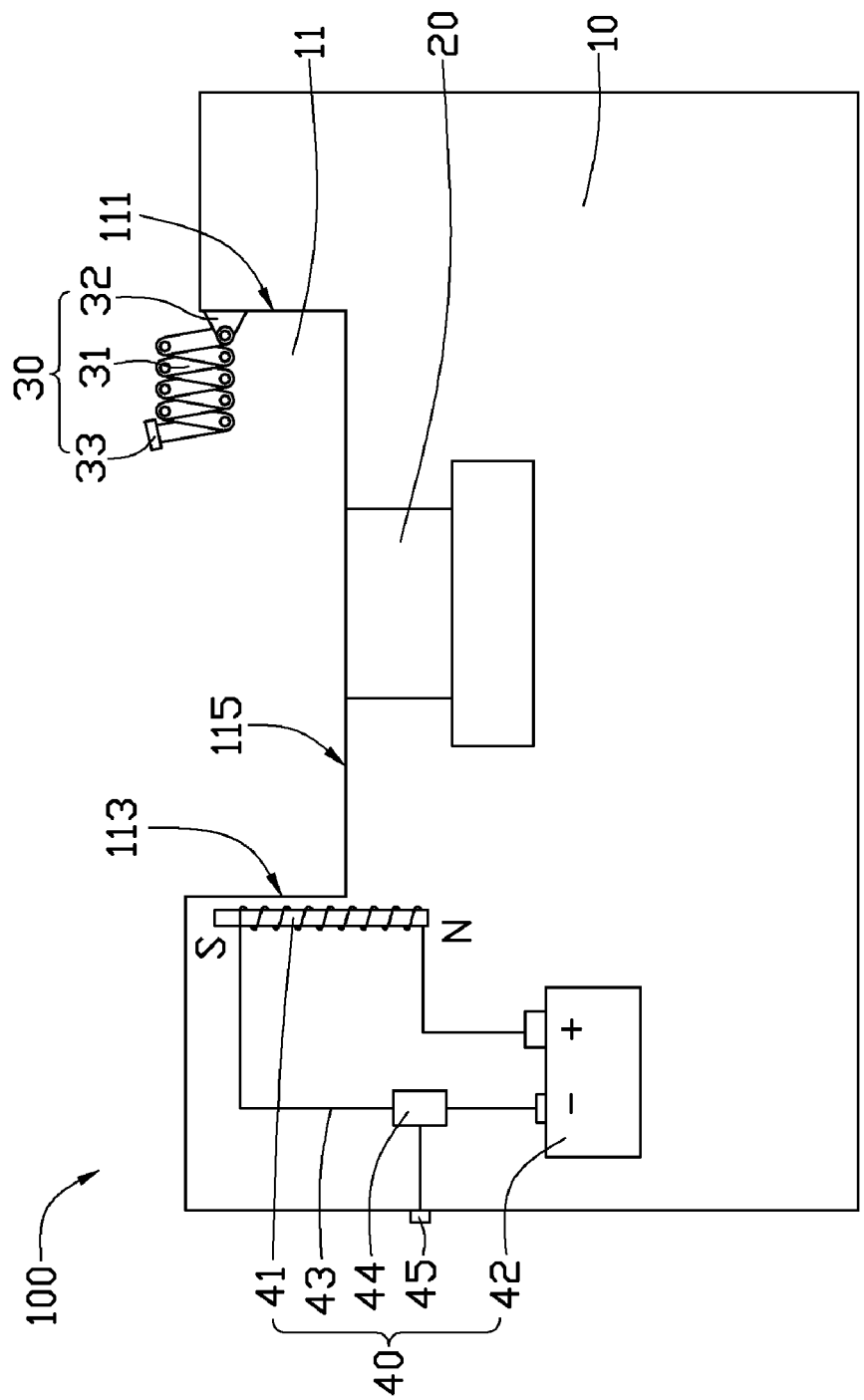
FIG. 2 is similar to FIG. 1, but shows the lens uncovered.

Referring to FIG. 2, if the electronic device 100 is to capture a plurality of image or video data, the control button 45 of the magnetic control assembly 40, when activated, turns the electromagnetic valve 44 off, such that the circuit is turned off and the magnetic field is no longer generated by the electromagnet. The magnetic body 33 is detached from the second inner sidewall 113. The lens cover 30 is thus easily withdrawn to collapse the collapsible portion 31 and uncover the lens 20. In other words, the lens cover 30 is deformed in a contracted state. During the collapse or extension of the lens cover 30, a plurality of plates of the collapsible portion 31 fold or unfold relative to each other in an accordion manner.

In the electronic device 100, the lens 20 is uncovered or covered by the collapse or extension of the lens cover 30. Since the lens cover 30 is collapsible, lesser room is required, and the volume of the electronic device 100 is thereby minimized.

In the electronic device 100, the lens cover 30 is capable of thoroughly covering the lens 20 by means of the magnetism created between the magnetic control assembly 40 and the magnetic body 33, and the lens 20 can be easily uncovered by turning off the magnetic control assembly 40.

In alternative embodiments, the control button 45 of the magnetic control assembly 40 may be omitted, with the magnetic valve 44 protruding from the main body 10. The magnetic control assembly 40 can be replaced by a permanent magnet if a larger force is required to collapse the collapsible portion 31 of the lens cover 30. The electromagnetic valve 44 may be omitted, and the circuit controlled by a switch.

Figure 3:
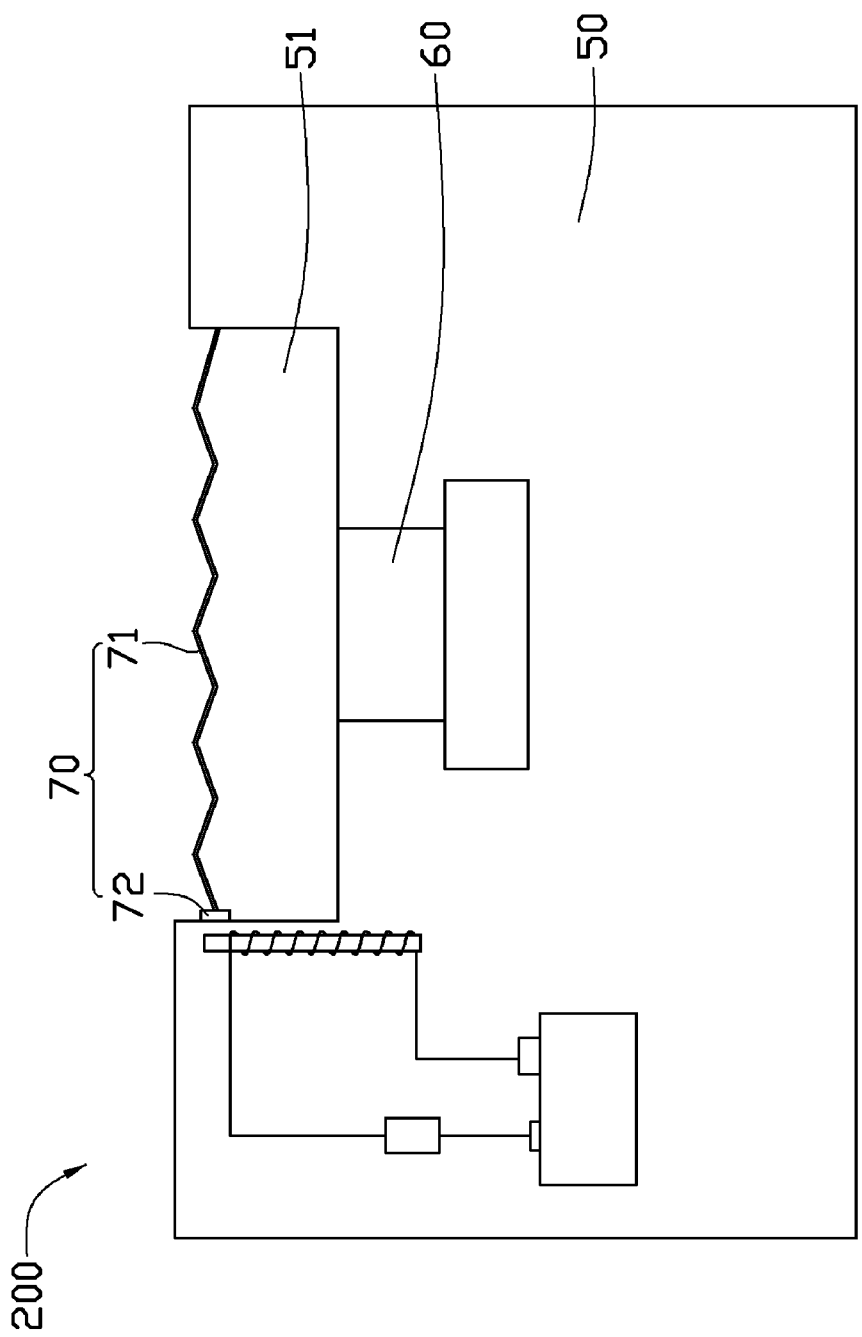
FIG. 3 is an assembled view of a second embodiment of an electronic device including a lens and a lens cover, showing the lens cover covering the lens.
Figure 4:
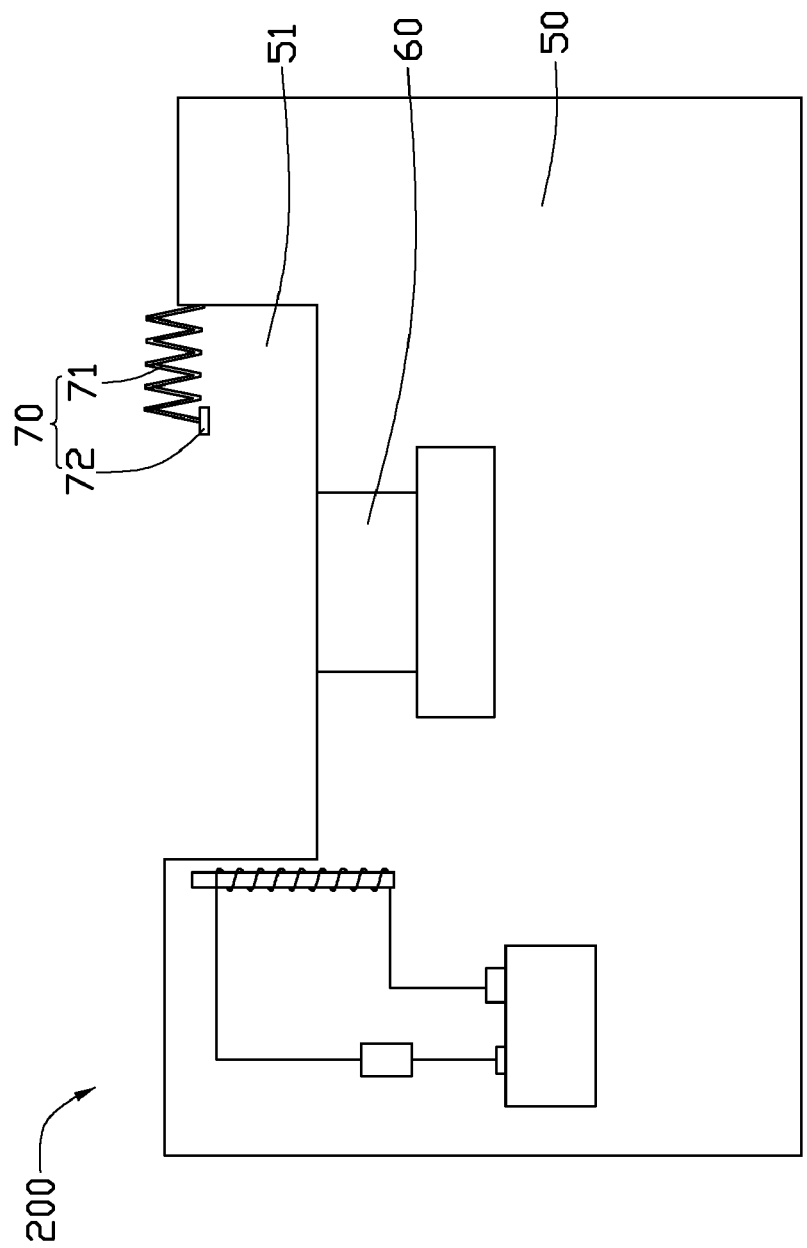
FIG. 4 is similar to FIG. 3, but shows the lens uncovered.

Referring to FIGS. 3 and 4, a second embodiment of an electronic device 200 is similar to the electronic device 100, differing only in that a lens cover 70 covering a lens 60 of the electronic device 200 includes a collapsible portion 71 and a magnetic body 72 connected to one end of the collapsible portion 71. The collapsible portion 71 is a single plate capable of collapsing into a plurality of segments. The collapsible portion 71 is made of an elastic material. An end of the collapsible portion 71 away from the magnetic body 72 is connected to an inner sidewall of the recess 51 of the main body 50. FIG. 3 shows the lens 60 covered by the lens cover 70 and that the lens 60 is shown to be uncovered in FIG. 4.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device, comprising:
   a main body;
   a lens received in the main body; and
   a collapsible lens cover having one end fixed on the main body and another end capable of resisting or detaching from the main body, wherein the lens cover is deformable between an extended state where the lens is correspondingly covered and a contracted state where the lens is correspondingly uncovered, respectively.

2. The electronic device of claim 1, wherein the main body defines a recess, the lens is exposed in the recess, the recess is defined by a first inner sidewall, a second inner sidewall opposite to the first inner sidewall, and an inner bottom surface connecting the first and second inner sidewalls, the one end of the lens cover is fixed on the first inner sidewall, and another end of the lens cover is capable of resisting or detaching from the second inner sidewall.

3. The electronic device of claim 2, wherein the lens cover comprises a magnetic body away from the end fixed on the main body.

4. The electronic device of claim 3, wherein the lens cover further comprises a collapsible portion and a fixing seat connected to the collapsible portion, the fixing seat is fixed to the main body and the collapsible portion interconnects the fixing seat and the magnetic body, and the collapsible portion comprises a plurality of plates individually hinged on each other.

5. The electronic device of claim 3, wherein the lens cover further comprises a collapsible portion, one end of the collapsible portion is fixed to the main body and another end of the collapsible portion is connected to the magnetic body, and the collapsible portion is a single plate collapsible into a plurality of segments.

6. The electronic device of claim 3, further comprising a magnetic control assembly partially received in the main body and adjacent to the second inner sidewall.

7. The electronic device of claim 6, wherein the magnetic control assembly comprises an iron core, a power supply, and a lead wire; the lead wire encircles the iron core and electrically connected to the power supply; and the iron core is adjacent to the second inner sidewall of the recess.

8. The electronic device of claim 7, wherein opposite magnetic poles of the magnetic control assembly and the magnetic body of the lens cover face each other.

9. The electronic device of claim 8, wherein the magnetic control assembly further comprises an electromagnetic valve and a control button, the electromagnetic valve is connected to the lead wire and the control button is connected to the electromagnetic valve, and the control button protrudes from the main body.

10. An electronic device, comprising:
    a main body;
    a lens received in the main body; and
    a lens cover having one end fixed on the main body and another end capable of making contact with or detaching from the main body, wherein the lens cover is deformable between a contracted state where the lens cover is collapsed to uncover the lens and an extended state where the lens cover is extended to cover the lens.

11. The electronic device of claim 10, wherein the main body defines a recess and the lens is exposed therein, the main body includes a first inner sidewall and an opposite second inner sidewall both exposed in the recess, the one end of the lens cover is fixed on the first inner sidewall and another end of the lens cover is capable of making contact with or detaching from the second inner sidewall.

12. The electronic device of claim 11, wherein the lens cover comprises a magnetic body away from the end fixed on the main body, the electronic device further comprises a magnetic control assembly partially received in the main body and adjacent to the second inner sidewall.

13. The electronic device of claim 12, wherein the lens cover further comprises a collapsible portion and a fixing seat connected thereto, the fixing seat is fixed to the main body, and the collapsible portion interconnects the magnetic body and the fixing seat and comprises a plurality of plates individually hinged on each other.

14. The electronic device of claim 12, wherein the lens cover further comprises a collapsible portion, one end of which is fixed to the main body and another end of which connected to the magnetic body, and the collapsible portion is a single plate collapsible into a plurality of segments.

15. The electronic device of claim 12, wherein the magnetic control assembly comprises an iron core, a power supply, and a lead wire; the lead wire encircles the iron core and electrically connected to the power supply, and the iron core is adjacent to the second inner sidewall of the recess.

16. The electronic device of claim 15, wherein opposite magnetic poles of the magnetic control assembly and the magnetic body of the lens cover face each other.

17. The electronic device of claim 16, wherein the magnetic control assembly further comprises an electromagnetic valve and a control button, the electromagnetic valve is connected to the lead wire and the control button is connected to the electromagnetic valve, and the control button protrudes from the main body.

18. An electronic device, comprising:
    a main body defining a recess therein, the main body including a first inner sidewall and an opposite second inner sidewall both exposed in the recess;
    a lens received in the main body and exposed in the recess; and
    a lens cover being deformable between an extended state and a contracted state, the lens cover including a first end portion, a second end portion, and a collapsible portion interconnecting the first and second end portions, the first end portion being fixed at the first inner sidewall, wherein when the lens cover is in the extended state, the collapsible portion is extended such that the lens is covered and the second end portion is in contact with the second inner sidewall, and when the lens cover is in the contracted state, the collapsible portion is folded such that the second end portion is detached from the second inner sidewall and the lens is uncovered.

19. The electronic device of claim 18, wherein the collapsible portion comprises a plurality of plates individually hinged on each other.

20. The electronic device of claim 18, wherein the second end portion is a magnetic body, the electronic device further comprises a magnetic control assembly adjacent to the second inner sidewall, and the magnetic body is capable of being attracted to be adjacent to the second inner sidewall due to the magnetic force.

* * * * *